US008495134B2

(12) United States Patent
Goto (10) Patent No.: US 8,495,134 B2
(45) Date of Patent: Jul. 23, 2013

(54) UPDATING CONTENT LIST IN LOCAL SERVER IN RESPONSE TO REQUEST FROM LOCAL REPRODUCTION DEVICE (75) Inventor: Satoru Goto, Ichikawa (JP)

(73) Assignee: Buffalo Inc., Nagoya-shi (JP)

( * ) Notice: Subject to any disclaimer, the term of this patent is extended or adjusted under 35 U.S.C. 154(b) by 134 days.

(21) Appl. No.: 12/887,095

(22) Filed: Sep. 21, 2010

(65) Prior Publication Data

US 2011/0072079 A1    Mar. 24, 2011

(30) Foreign Application Priority Data

Sep. 24, 2009  (JP) .................................. 2009-219807

(51) Int. Cl.
*H04L 29/06* (2006.01)
(52) U.S. Cl.
USPC ........................................................ 709/203
(58) Field of Classification Search
USPC .................. 709/201, 203, 208, 246
See application file for complete search history.

(56) References Cited

U.S. PATENT DOCUMENTS

| 5,696,901 | A | * | 12/1997 | Konrad | 709/203 |
| 6,073,163 | A | * | 6/2000 | Clark et al. | 709/203 |
| 2005/0188048 | A1 | * | 8/2005 | Yuan et al. | 709/208 |
| 2007/0208818 | A1 | * | 9/2007 | Manders | 709/208 |
| 2007/0237090 | A1 | * | 10/2007 | Kim et al. | 370/252 |
| 2008/0208952 | A1 | * | 8/2008 | Yoshida et al. | 709/201 |
| 2008/0250037 | A1 | * | 10/2008 | Date et al. | 707/100 |

FOREIGN PATENT DOCUMENTS

| JP | 2007-221660 | 8/2007 |
| JP | 2008-41120 | 2/2008 |

OTHER PUBLICATIONS

U.S. Appl. No. 12/887,072, filed Sep. 21, 2010, Goto.
Japanese Office Action issued May 17, 2011, in Patent Application No. 2009-219807 (with English-language translation).
Miki Oofuji, "The revised edition of the detailed explanation dictionary about HTML, CSS and JavaScript", Apr. 1, 2007, 2 pgs. (with English translation).
Masahito Hannba, "The revised edition of the detailed explanation dictionary about JavaScript and Cross-Browser Dynamic", Jun. 20, 2009, 2 pgs. (with English translation).

* cited by examiner

*Primary Examiner* — Lance L Barry
(74) *Attorney, Agent, or Firm* — Oblon, Spivak, McClelland, Maier & Neustadt, L.L.P.

(57) ABSTRACT

A local server transmits list update information for requesting update of the content list serving as the content list to the local reproduction device. The local server receives a list update request from the local reproduction device, the list update request indicating that the list update information has been selected. The local server updates the content list according to the list update request.

8 Claims, 6 Drawing Sheets

UPDATING CONTENT LIST IN LOCAL SERVER IN RESPONSE TO REQUEST FROM LOCAL REPRODUCTION DEVICE

CROSS REFERENCE TO RELATED APPLICATION

This application is based upon and claims the benefit of priority from the prior Japanese Patent Application No. 2009-219807 filed on Sep. 24, 2009; the entire contents of which are incorporated herein by reference.

BACKGROUND OF THE INVENTION

1. Field of the Invention

The present invention relates to a local server and a method for controlling the same where the local server transmits a content list to a local reproduction device connected to the local server via a local network, the content list being a list of content that is capable of being provided to the local reproduction device.

2. Description of the Related Art

In recent years, technologies aimed to promote utilization of content data such as video and audio data in DLNA (Digital Living Network Alliance) have been under development. For example, studies have been in progress on technologies promoting utilization of content data by transmitting the content data from a local server, so-called DMS (Digital Media Server) to a local reproduction device, so-called DMP (Digital Media Player).

Here, the content transmitted from the local server to the local reproduction device is managed by using a content list called CDS (Content Directory Service). In the CDS, content is managed in tiers. Users view and listen to desired content using CDS (content list) displayed by the local reproduction device.

SUMMARY OF THE INVENTION

Content may be added to the local server or content may be deleted from the local server. The local server updates its content list periodically. Thus, it is generally assumed that the consistency between the content and the content list managed by the local server may not be maintained temporarily.

Although update of the content list may be requested from a local reproduction device to the local server, this requires dedicated software to be installed to the local reproduction device.

However, it is assumed that the local reproduction device does not have a feature to allow installation of new software. In such case, requesting update of the content list from the local reproduction device to the local server is not possible.

Thus, the present invention is made in order to solve the problem described above, and it is an object of the present invention to provide a local server and a method for controlling the same which enable a local reproduction device to request update of a content list without installing dedicated software to the local reproduction device.

In an aspect of the present invention, a local server (local server 200) configured to transmit a content list to a local reproduction device (local reproduction device 300) connected to the local server via a local network (local network 100), the content list being a list of content that is capable of being provided to the local reproduction device, the local server comprising: a transmitter (processor 220, local communication unit 210) configured to transmit list update information (list update information C) for requesting update of the content list as the content list to the local reproduction device; a receiver (processor 220, local communication unit 210) configured to receive a list update request from the local reproduction device, the list update request indicating that the list update information has been selected; and an updater (content list generator 240) configured to update the content list according to the list update request.

DESCRIPTION OF EMBODIMENTS

Next, an embodiment of the present invention is described with reference to the drawings. In the following description of the drawings, same or similar components are labeled with the same of similar reference numerals. However, it should be noted that the drawings are schematic, and ratios between dimensions are different from actual ones. Accordingly, specific dimensions should be determined in consideration of the following description. Of course, the drawings include parts between which dimensional relationship and ratios are different from each other.

First Embodiment

A first embodiment of the present invention is described below with reference to the drawings. Specifically, (1) Schematic Configuration of Content Transmission System, (2) Configuration of Local Server, (3) Configuration of Local Reproduction Device, (4) Operations of Content Transmission System, and (5) Operations and Effects are described.

(1) Schematic Configuration of Content Transmission System

Figure 1:
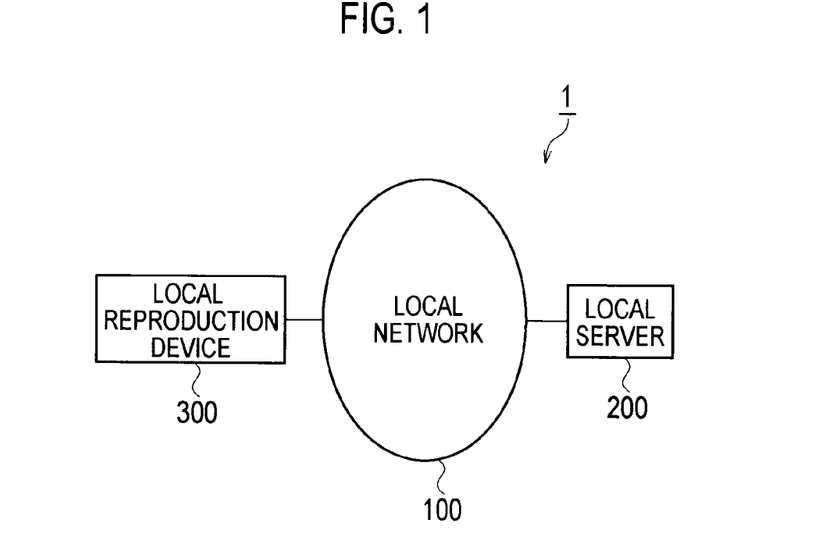
FIG. 1 is a diagram showing a content transmission system according to a first embodiment.

First, a schematic configuration of a content transmission system according to the first embodiment of the present invention is described with reference to FIG. 1. FIG. 1 is a diagram showing a content transmission system 1 according to the first embodiment.

As shown in FIG. 1, the content transmission system 1 includes a local network 100, a local server 200, and a local reproduction device 300.

The local network 100 is a local network such as a LAN or a wireless LAN. The local network 100 is provided independently of a public network such as the Internet.

The local server 200 is connected to the local reproduction device 300 via the local network 100. The local server 200 is a content server that provides the local reproduction device 300 with predetermined content. The local server 200 transmits a content list to the local reproduction device 300 via the local network 100, the content list being a list of content that is capable of being provided to the local reproduction device 300.

Specifically, the local server 200 provides the local reproduction device 300 with normal audiovisual content and list update content.

The normal audiovisual content is content that is capable of being provided from the local server 200 to the local reproduction device 300 in periods other than the period when the content list is updated in the local server 200. The normal audiovisual content includes, for example, audio content, video content, and image content.

The local reproduction device 300 is connected to the local server 200 via the local network 100. The local reproduction device 300 is a device that acquires predetermined content using a content list received from the local server 200, and reproduces the acquired content.

(2) Configuration of Local Server

Next, a configuration of a local server according to the first embodiment of the present invention is described with reference to FIGS. 2 to 5.

(2.1) Schematic Structure of Local Server

Figure 2:
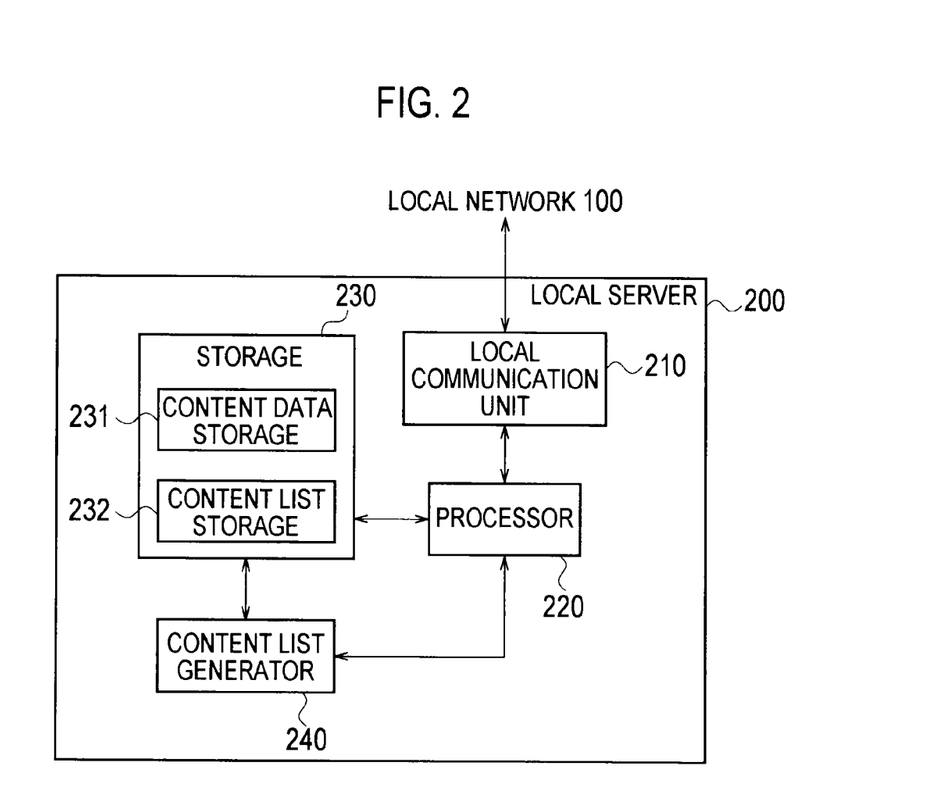
FIG. 2 is a diagram showing a local server according to the first embodiment.

FIG. 2 is a diagram showing the local server 200 according to the first embodiment. As shown in FIG. 2, the local server 200 includes a local communication unit 210, a processor 220, a storage 230, and a content list generator 240.

The local communication unit 210 is a hardware interface to connect the local server 200 to the local network 100. As the local communication unit 210, a LAN port or a wireless LAN port, or the like is used.

The processor 220 performs transmission processing of a content list and provision processing of content. The details of the processing by the processor 220 are described in detail hereinafter.

The storage 230 is a storage as a HDD that stores predetermined information. As shown in FIG. 2, the storage 230 has a content data storage 231 and a content list storage 232.

The content data storage 231 stores the data of content that is capable of being provided to the local reproduction device 300.

First, the content data storage 231 stores data of the normal audiovisual content (hereinafter referred to as normal audiovisual content data), and the content name assigned to the normal audiovisual content so that the content data and name are associated with each other. The normal audiovisual content data includes, for example, audio data, video data, and image data.

Second, the content data storage 231 stores data of list update content (hereinafter referred to as list update content data). As list update content data, audio data, video data, or image data is used, for example.

The content list storage 232 stores a content list generated by the content list generator 240. The content list stored in the content list storage 232 has a tree structure in which multiple items are tiered.

Figure 3:
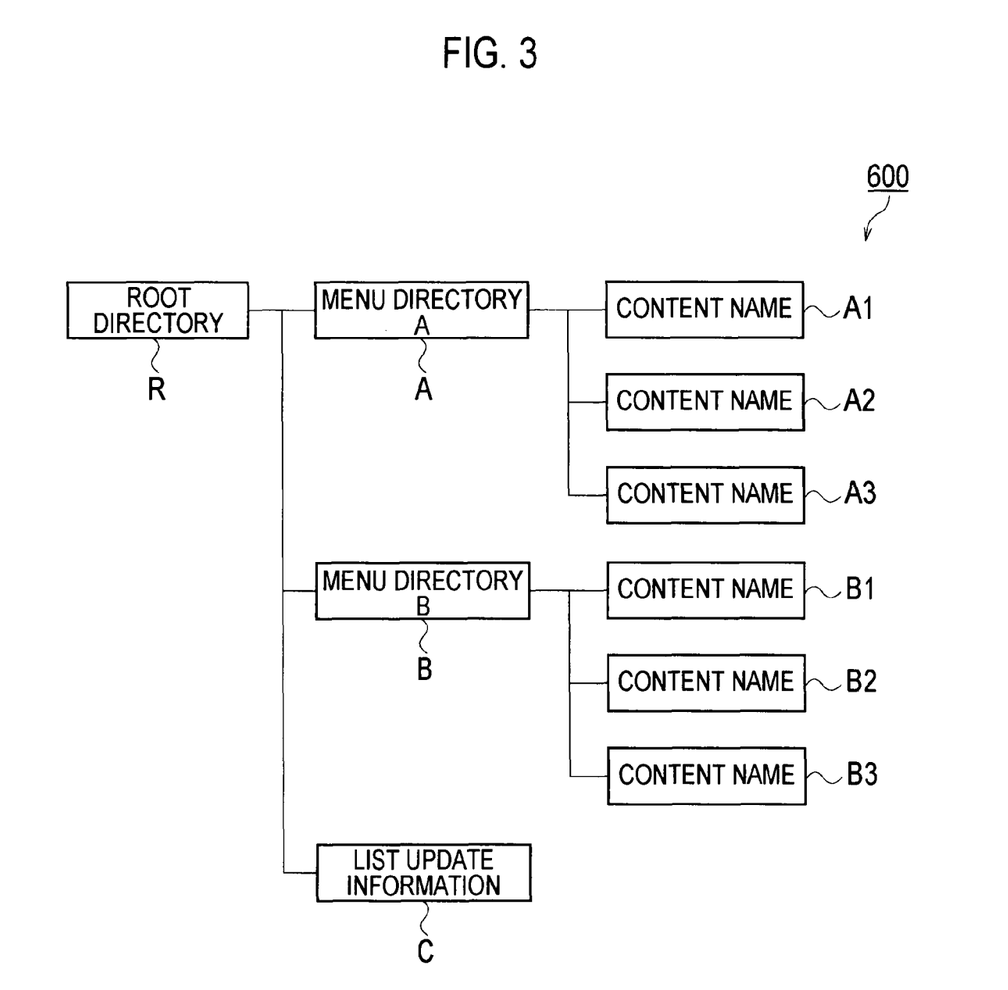
FIG. 3 is a diagram showing an example of a configuration of a content list according to the first embodiment.

Referring to FIG. 3, the structure of the content list stored in the content list storage 232 is described. FIG. 3 is a diagram showing an example of the structure of the content list.

As shown in FIG. 3, a content list 600 has a tree structure in which the root directory is placed in the top layer. The content list includes multiple items such as a root directory R, menu directories A, B, content names A1 to A3, B1 to B3, and list update information C.

The root directory R is an item that is used to request the items indicating the types of content that is capable of being provided to the local reproduction device 300. In the immediate lower layer of the root directory R, as items indicating the types of content that is capable of being provided to the local reproduction device 300, the menu directories A, B, and the list update information C are placed where the menu directories A, B indicate the types of the normal audiovisual content, and the list update information C is used for requesting update of the content list.

The content names A1 to A3 are the items to represent the content names assigned to the normal audiovisual content data corresponding to the type of the normal audiovisual content indicated by the menu directory A. Similarly, the content names B1 to B3 are the items to represent the content names assigned to the normal audiovisual content data corresponding to the type of the normal audiovisual content indicated by the menu directory B.

For example, if the menu directory A represents audio content, the content names A1 to A3 represent the content names assigned to the audio content data of the normal audiovisual content data stored in the content data storage 231. For example, if the menu directory B represents video content, the content names B1 to B3 represent the content names assigned to the video content data of the normal audiovisual content data stored in the content data storage 231.

The content list generator 240 generates a content list that is a list of content that is capable of being provided to the local reproduction device 300. Specifically, the content list generator 240 generates a content list including the content names assigned to the normal audiovisual content data stored in the content data storage 231.

The content list generator 240 generates a content list periodically. The content list generator 240 also generates a content list according to a list update instruction acquired from the processor 220.

The content list generator 240 updates the content list stored in the content list storage 232 to a newly generated content list. That is, the content list generator 240 serves as an updater that updates the content list. The content list generator 240, when completing the update of the content list, inputs a list update completion notification to the processor 220, the list update completion notification indicating the completion of update of the content list.

Figure 4:
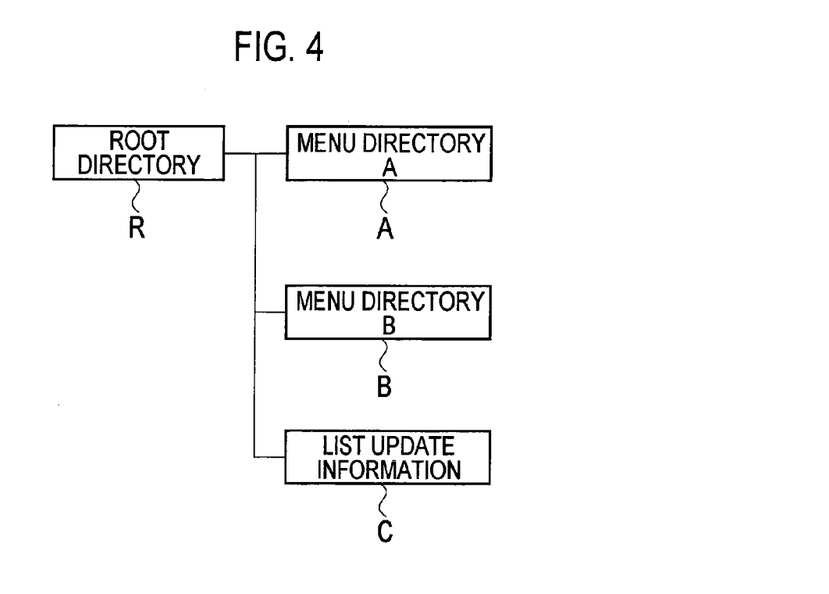
FIG. 4 is a diagram showing a generation process of the content list according to the first embodiment (#1).
Figure 5:
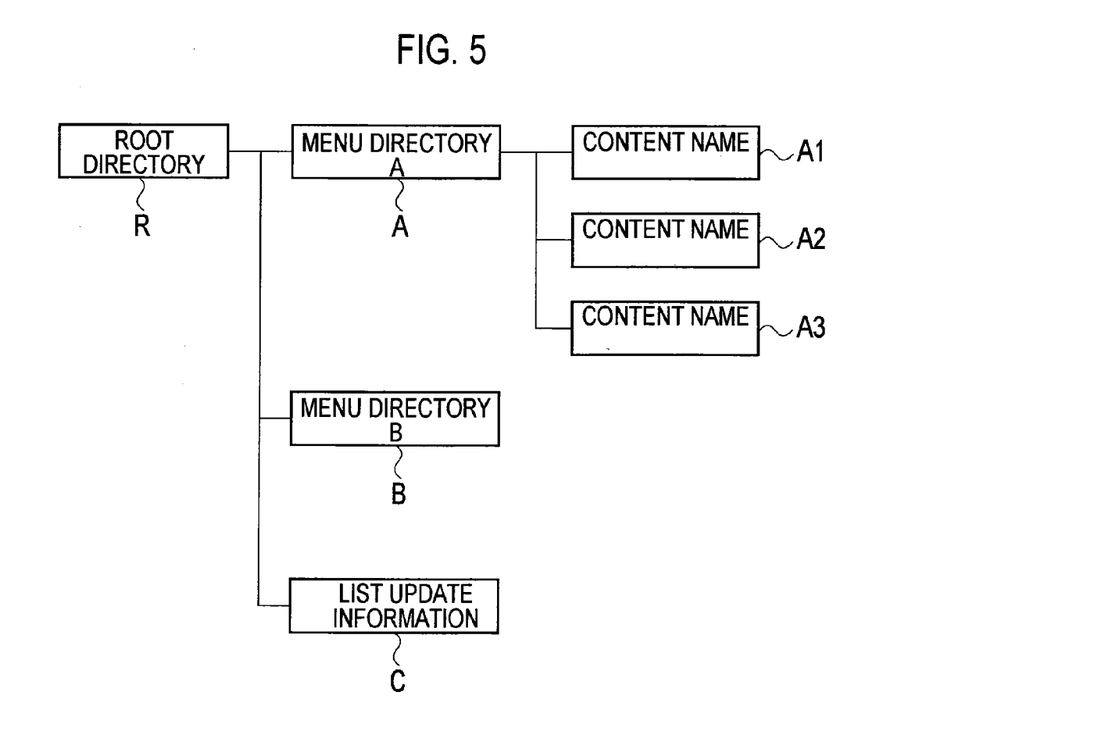
FIG. 5 is a diagram showing the generation process of the content list according to the first embodiment (#2).

The content list generator 240 generates a content list having, for example, the structure shown in FIG. 3. FIGS. 4 and 5 are diagrams showing a generation process of the content list by the content list generator 240.

First, the content list generator 240 generates items placed in the immediate lower layer of the root directory R. Specifically, as shown in FIG. 4, the content list generator 240 places the menu directories A, B, and the list update information C in the immediate lower layer of the root directory R.

Second, the content list generator 240 generates items placed in the immediate lower layer of the menu directory A. Specifically, as shown in FIG. 5, the content list generator 240 acquires the content names A1 to A3 from the content data storage unit 231, and places the acquired content names in the immediate lower layer of the menu directory A, the content names A1 to A3 being assigned to the normal audiovisual content data corresponding to the type of content (for example, audio content) represented by the menu directory A.

Similarly, the content list generator 240 generates items placed in the immediate lower layer of the menu directory B. Specifically, the content list generator 240 acquires the content names B1 to B3 from the content data storage unit 231, and places the acquired content names in the immediate lower layer of the menu directory B, the content names being assigned to the normal audiovisual content data corresponding to the type of content (for example, video content) represented by the menu directory B. In this manner, a content list having the structure shown in FIG. 3 is formed.

Although not shown, the local server 200 may include a program holder that holds a program for causing a CPU to execute processing for the local communication unit 210, the processor 220, the storage 230, and the content list generator 240. As the program holder, a recording media such as a RAM, a ROM, a hard disk, a flexible disk, a compact disc, an IC chip, or a cassette tape is used, for example (2.2) Details of Processing by Processor Next, details of the processing by the processor 220 according to the first embodiment of the present invention are described. In the following, it is assumed that a content list has the structure shown in FIG. 3.

First, the processor 220 receives a content list transmission request from the local reproduction device 300 via the local communication unit 210, the content list transmission request requesting transmission of the content list.

The processor 220, when receiving the content list transmission request, transmits an item to the local reproduction device 300, the item being used to request the items indicating the types of content that is capable of being provided to the local reproduction device 300. Specifically, the processor 220 transmits the root directory R placed in the top layer of the content list as a content list to the local reproduction device 300.

In response to the transmission of the root directory R, the processor 220 receives selected item information from the local reproduction device 300, the selected item information indicating that the root directory R has been selected.

In response to the reception of the selected item information indicating that the root directory R has been selected, the processor 220 transmits items to the local reproduction device 300, the items indicating the types of content that is capable of being provided to the local reproduction device 300. Specifically, the processor 220 transmits the menu directories A, B, and the list update information C as a content list to the local reproduction device 300, the menu directories A, B, and the list update information C being placed in the immediate lower layer of the root directory R.

In response to the transmission of the menu directories A, B, and the list update information C, the processor 220 receives selected item information from the local reproduction device 300, the selected item information indicating that anyone of the menu directories A, B, and the list update information C has been selected. The processor 220 performs processing according to the selected item.

(a) Processing when Menu Directory is Selected

The processor 220, when receiving the selected item information indicating that an item (i.e., a menu directory) representing the type of the normal audiovisual content has been selected, transmits items as a content list to the local reproduction device 300, the items located in the immediate lower layer of the item indicated by the elected item information, i.e., the items representing the content names assigned to the normal audiovisual content data corresponding to the selected type.

The processor 220, when receiving selected item information indicating an item selected from the items representing the content names from the local reproduction device 300, reads normal audiovisual content data from the content data storage 231, the normal audiovisual content data corresponding to the type of the normal audiovisual content indicated by the received selected item information, i.e., the normal audiovisual content data to which the selected content name is assigned.

The processor 220 transmits the read normal audiovisual content data to the local reproduction device 300.

In this manner, the normal audiovisual content is provided to the local reproduction device 300.

Referring to FIG. 3, a specific example of processing when a menu directory is selected is described.

First, the processor 220 transmits the menu directories A, B, and the list update information C as a content list to the local reproduction device 300, the menu directories A, B, and the list update information being the items located in the immediate lower layer of the root directory R.

The processor 220 then receives selected item information indicating the menu directory A from the local reproduction device 300. This shows that the local reproduction device 300 is requesting provision of audio content from the normal audiovisual content stored in the local server 200.

The processor 220 transmits the content names A1 to A3 as a content list to the local reproduction device 300, the content names A1 to A3 being the items located in the immediate lower layer of the menu directory A. The content names A1 to A3 each represents names assigned to audio content.

The processor 220 then receives selected item information indicating the content name A1. This shows that the local reproduction device 300 is requesting provision of the audio content to which the content name A1 is assigned from the audio content stored in the local server 200.

The processor 220 reads the normal audiovisual content data corresponding to the content name A1 from the content data storage unit 231. The processor 220 then transmits the read normal audiovisual content data to the local reproduction device 300.

(b) Processing When List Update Information is Selected

The processor 220, when receiving a list update request indicating that the list update information C has been selected, reads list update content data from the content data storage unit 231 and inputs a list update instruction to the content list generator 240, the list update instruction being used for instructing generation and update of a content list.

The processor 220 continues to transmit the read list update content data to the local reproduction device 300 until update of the content list is completed.

The processor 220, when acquiring an update completion notification from the content list generator 240, stops transmission of the list update content data, the update completion notification indicating the complete ion of the update of the content list. The processor 220 then transmits items as a content list to the local reproduction device 300, the items indicating the types of content that is capable of being provided to the local reproduction device 300, i.e., the menu directories A, B, and the list update information C in the updated content list.

Even if the processor 220 receives selected item information during the update of the content list, the processor 220 does not perform transmission of the content list or content data to the local reproduction device 300.

(3) Configuration of Local Reproduction Device

Figure 6:
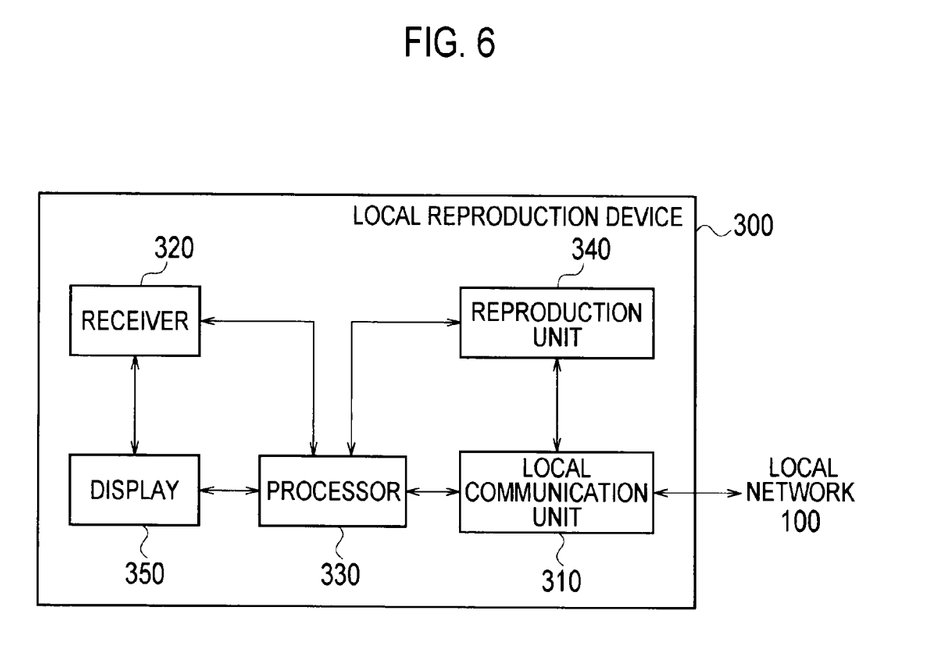
FIG. 6 is a diagram showing a local reproduction device according to the first embodiment.

Next, a configuration of a local reproduction device according to the first embodiment of the present invention is described with reference to FIG. 6. FIG. 6 is a diagram showing the local reproduction device 300 according to the first embodiment.

As shown in FIG. 6, the local reproduction device 300 includes a local communication unit 310, a receiver 320, a processor 330, a reproduction unit 340, and a display 350.

The local communication unit 310 is a hardware interface to connect the local reproduction device 300 to the local network 100. For the local communication unit 310, a LAN port or a wireless LAN port may be used.

The receiver 320 receives a request to operate the local reproduction device 300 from the outside of the local reproduction device 300. The receiver 320 receives, for example, a request for a content list display. The receiver 320 inputs the received request to the processor 330. The receiver 320 receives information to select item(s) from the content list displayed on the display 350 from the outside of the local reproduction device 300.

As the receiver 320, a touch panel or a keyboard that is an operation device operable by a user of the local reproduction device 300, or a radio signal receiver from a remote controller, or a button that can be pressed by a user and arranged on the outer surface of the local reproduction device 300 may be used.

The processor 330 performs transmission processing of a request to the local server 200, and reception processing of information from the local server 200.

The processor 330, when acquiring a content list display request from the receiver 320, transmits a content list transmission request requesting transmission of a content list to the local server 200 via the local communication unit 310.

According to the content list transmission request, the processor 330 receives the root directory R as a content list from the local server 200, the root directory R being the item used to request the items indicating the types of content that is capable of being provided to the local reproduction device 300, i.e., the directory R placed in the top layer of the content list. The processor 330 inputs the received root directory R to the display 350.

The processor 330, when acquiring information selecting the root directory R from the receiver 320, generates selected item information indicating the root directory R. The processor 330 transmits the generated selected item information to the local server 200 via the local communication unit 310.

According to the selected item information indicating the root directory R, the processor 330 receives the menu directories A, B, and the list update information C as a content list from the local server 200, the menu directories A, B being the items indicating the types of the normal audiovisual content, the list update information C being used for requesting update of the content list. The processor 330 inputs the received items to the display 350.

The processor 330 generates selected item information according to the information acquired from the receiver 320.

The processor 330, when acquiring information selecting the menu directory A from the receiver 320, generates selected item information indicating the menu directory A, and transmits the generated selected item information to the local server 200. The processor 330 receives the content names A1 to A3 from the local server 200 according to the selected item information indicating the menu directory A. The processor 330 inputs the received items to the display 350.

Similarly, the processor 330, when acquiring information selecting the menu directory B from the receiver 320, generates selected item information indicating the menu directory B, and transmits the generated selected item information to the local server 200. The processor 330 receives the content names B1 to B3 from the local server 200 according to the selected item information indicating the menu directory B. The processor 330 inputs the received items to the display 350.

The processor 330, when acquiring information selecting the content names from the receiver 320, generates selected item information indicating the content names, and transmits the generated selected item information to the local server 200. The processor 330 receives the normal audiovisual content data corresponding to the content names indicating the selected item information from the local server 200. The processor 330 inputs to the received normal audiovisual content to the reproduction unit 340.

The processor 330, when acquiring information selecting the list update information C from the receiver 320, generates a list update request and transmits the generated list update request to the local server 200. In response to the list update request, the processor 330 receives list update content data from the local server 200, the list update content data being used for notifying that update of the content list is in progress.

The processor 330 inputs the received list update content data to the reproduction unit 340. When the update of the content list is completed, reception of the list update content data is stopped, and items are received as a content list, the items indicating the types of content that may be provided to the local reproduction device 300, i.e., the menu directories A, B indicating the types of the normal audiovisual content, and the list update information C for requesting update of the content list.

The reproduction unit 340 performs reproduction processing of the content data acquired from the processor 330. The reproduction unit 340 is configured with, for example, a display that displays a video, an image, or string (text), and/or a speaker that outputs audio.

The display 350 displays the items of a content list acquired from the processor 330.

For example, when acquiring the root directory R, the display 350 displays a string or an image such as "Menu." Also, for example, when acquiring the menu directories A, B, and the list update information C, the display 350 displays a string or an image such as "Menu A: audio", "Menu B: video", and "Menu C: content list update."

Although not shown, the local reproduction device 300 may include a program holder that holds a program for causing a CPU to execute processing of the local communication unit 310, the receiver 320, the processor 330, the reproduction unit 340, and the display 350. As a program holder, a recording media such as a RAM, a ROM, a hard disk, a flexible disk, a compact disc, an IC chip, or a cassette tape may be used, for example.

(4) Operations of Content Transmission System

In the following, operations of the content transmission system according to the first embodiment of the present invention are described with reference to FIGS. 7 and 8.

(4.1) In the Case of Provision of Normal Audiovisual Content

Figure 7:
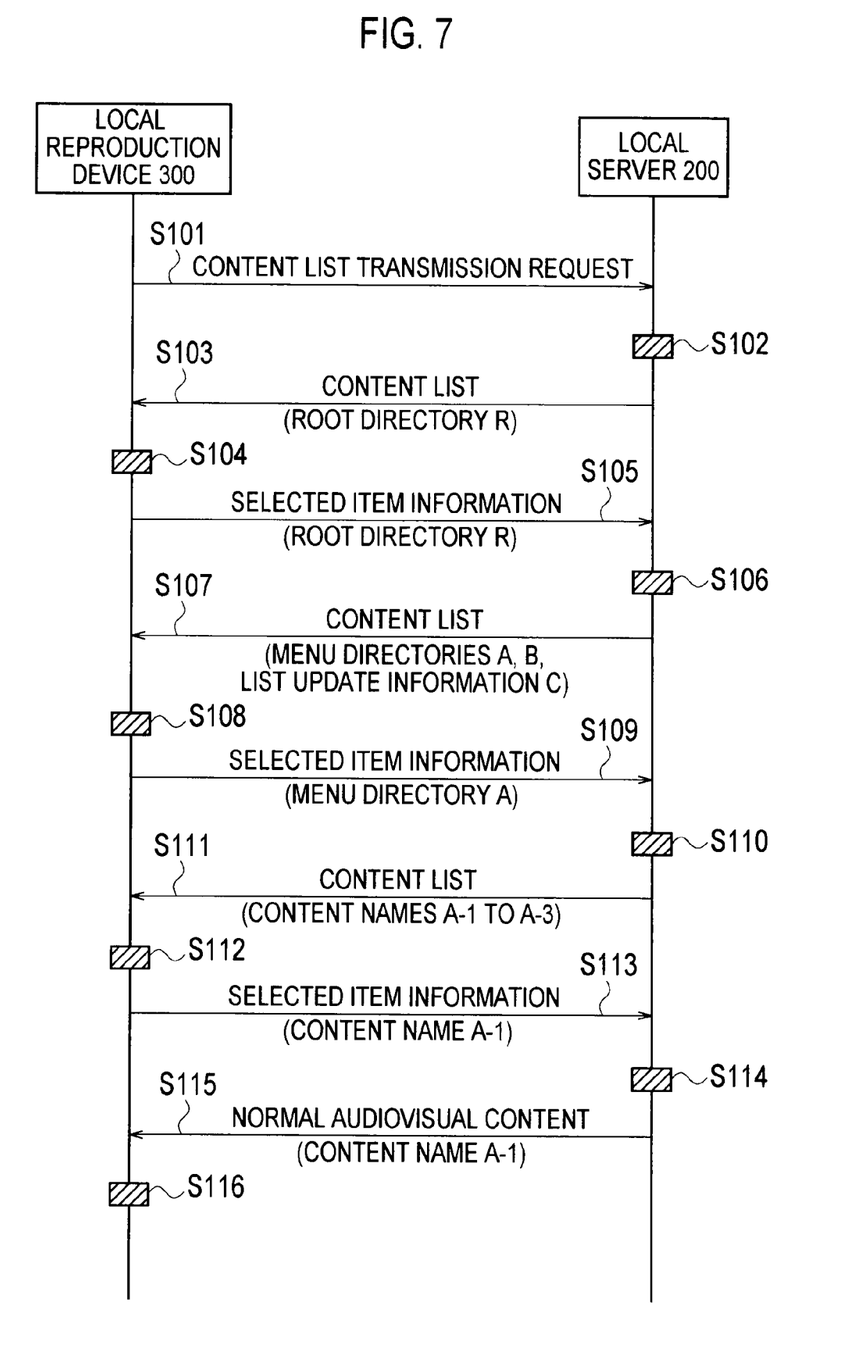
FIG. 7 is a sequence diagram showing operations of the content transmission system according to the first embodiment (provision of normal audiovisual content).

FIG. 7 is a sequence diagram showing operations of the content transmission system for providing the normal audiovisual content.

As shown in FIG. 7, in step S101, the local reproduction device 300 transmits a content list transmission request to the local server 200.

In step S102, the local server 200 extracts the root directory R which is an item used to request the items indicating the types of content that is capable of being provided to the local reproduction device 300 from a content list.

In step S103, the local server 200 transmits the extracted root directory R as a content list to the local reproduction device 300.

In step S104, the local reproduction device 300 displays the received root directory R. For example, the local reproduction device 300 displays a string or an image such as "Menu" on the display 350. The local reproduction device 300, after displaying the root directory R, receives information selecting the root directory R from the outside of the local reproduction device 300.

In step S105, the local reproduction device 300 transmits selected item information to the local server 200, the selected item information indicating that the root directory R has been selected.

In step S106, the local server 200 extracts items from the content list, the items indicating the types of content that is capable of being provided to the local reproduction device 300, i.e., the menu directories A, B indicating the types of the normal audiovisual content, and the list update information C for requesting update of the content list.

In step S107, the local server 200 transmits the extracted menu directories A, B, and the list update information C as a content list to the local reproduction device 300.

In step S108, the local reproduction device 300 displays the received menu directories A, B, and the list update information C. For example, the local reproduction device 300 displays a string or an image such as "Menu A: audio", "Menu B: video", and "Menu C: content list update" on the display 350. The local reproduction device 300, after displaying the menu directories A, B, and the list update information C, receives information selecting the menu directory A from the outside of the local reproduction device 300.

In step S109, the local reproduction device 300 transmits selected item information to the local server 200, the selected item information indicating that the menu directory A has been selected.

In step S110, the local server 200 extracts the content names A1 to A3 from the content list, the content names A1 to A3 being items placed in the immediate lower layer of the selected menu directory A.

In step S111, the local server 200 transmits the extracted content names A1 to A3 as a content list to the local reproduction device 300.

In step S112, the local reproduction device 300 displays the received content names A1 to A3. For example, the local reproduction device 300 displays a string or an image such as "Music title A1", "Music title A2", and "Music title A3" on the display 350. The local reproduction device 300, after displaying the content names A1 to A3, receives information selecting the content name A1 from the outside of the local reproduction device 300.

In step S113, the local reproduction device 300 transmits selected item information to the local server 200, the selected item information indicating that content name A1 has been selected.

In step S114, the local server 200 reads the normal audiovisual content data corresponding to the content name A1.

In step S115, the local server 200 transmits the read normal audiovisual content data to the local reproduction device 300.

In step S116, the local reproduction device 300 reproduces the received normal audiovisual content data.

(4.2) In the Case of Update of Content List

Figure 8:
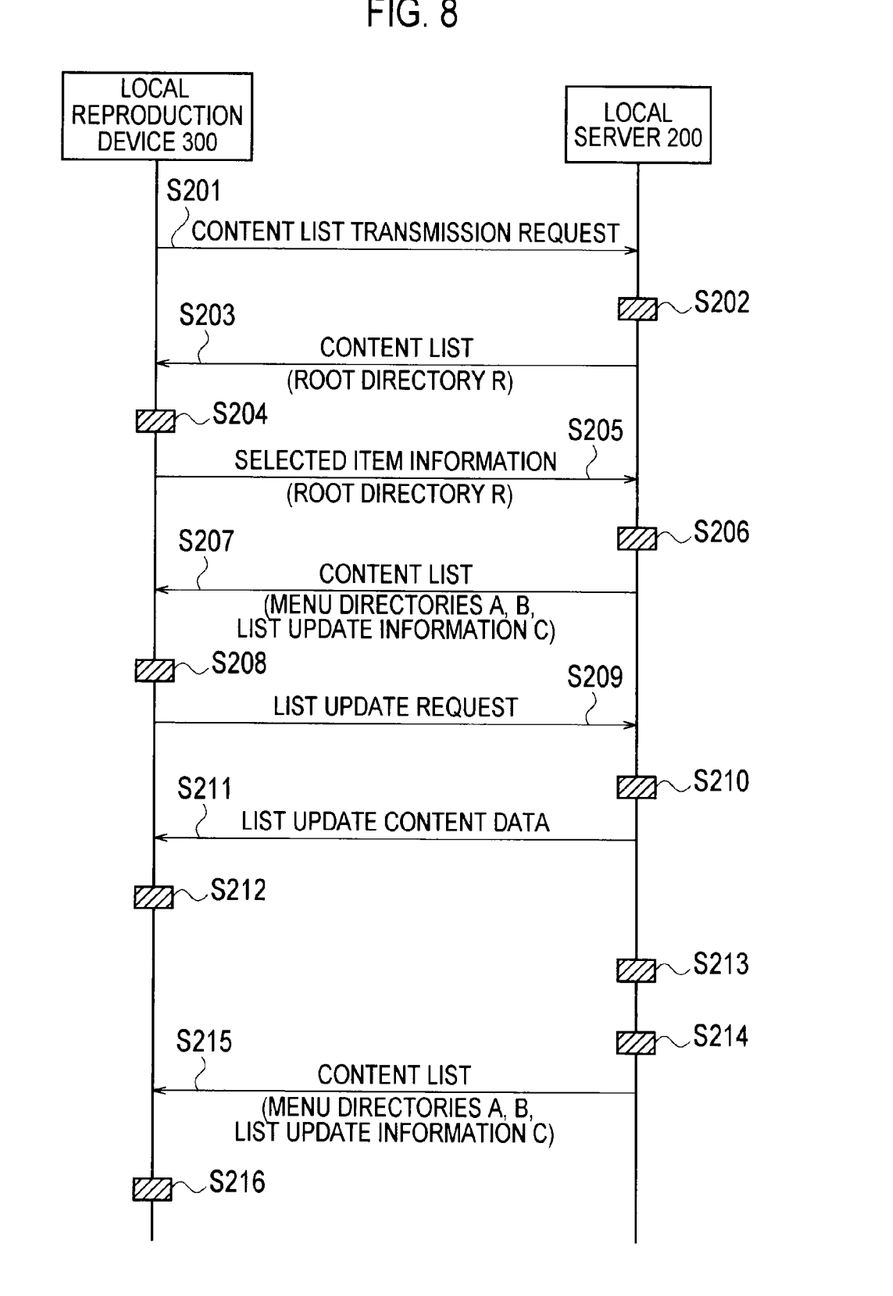
FIG. 8 is a sequence diagram showing operations of the content transmission system according to the first embodiment (content list update).

FIG. 8 is a sequence diagram showing operations of the content transmission system for updating the content list. Since the steps S201 to S208 in FIG. 8 are similar to the steps S101 to S108 in FIG. 7, descriptions thereof are omitted.

As shown in FIG. 8, in step S209, the local reproduction device 300 transmits a list update request to the local server 200, the list update request indicating that the list update information C has been selected.

In step S210, the local server 200 starts to update the content list and reads the list update content data.

In step S211, the local server 200 transmits the read list update content data to the local reproduction device 300.

In step S212, the local reproduction device 300 reproduces the received list update content data.

In step S213, the local server 200 detects the completion of update of the content list. The local server 200 then stops transmitting the list update content data.

In step S214, the local server 200 extracts items from the updated content list, the items indicating the content that is capable of being provided to the local reproduction device 300, i.e., the menu directories A, B, and the list update information C.

In step S215, the local server 200 transmits the extracted menu directories A, B, and the list update information C as a content list to the local reproduction device 300.

In step S216, the local reproduction device 300 displays the received menu directories A, B, and the list update information C.

As subsequent processing after step S216, processing in step S109 to step S116 in FIG. 7, or processing in step S209 to Step S215 in FIG. 8 are performed.

(5) Operations and Effects

According to the content transmission system 1 of the first embodiment of the present invention, the local reproduction device 300, when receiving a content list request from the outside of the local reproduction device 300, transmits a content list request requesting transmission of the content list to the local server 200. In response to the reception of the content list request, the local server 200 transmits items as a content list to the local reproduction device 300, the items indicating the types of content that is capable of being provided to the local reproduction device 300, i.e., the menu directories A, B representing the types of the normal audiovisual content, and the list update information C for requesting update of the content list.

The local server 200, when receiving a list update request from the local reproduction device 300, updates the content list, the list update request indicating that the list update information C has been selected in the local reproduction device 300.

According to such configuration, information to update the content list is transmitted to the local reproduction device 300 in a format that is capable of being used by the local reproduction device 300, i.e., the content list format. Accordingly, update of the content list may be requested to the local server 200 even by the local reproduction device 300 in which dedicated software for requesting the update of the content list to the local server 200 is not installed.

Thus, update of the content list may be requested from the local reproduction device 300 without installing dedicated software to the local reproduction device 300.

Other Embodiments

Although the invention has been disclosed through the embodiment according to the present invention as described above, it should be understood that the discussion and drawings which form a part of the disclosure are not intended to limit the invention. Various alternative embodiments, implementation examples, and application techniques will be apparent to those skilled in the art.

For example, although the first embodiment mentioned above is described for the case where one local reproduction device 300 is connected to the local network 100; however, the present invention is not limited to this case. For example, multiple local reproduction devices 300 may be connected to the local network 100.

The above-mentioned first embodiment has been described in the case where when the update of the content list is completed, transmission of the list update content data is stopped, the list update content data being used for notifying that update of the content list is in progress. The local server 200, after stopping the transmission of the list update content data, may further transmit list update content data for notifying the completion of update of the content list.

The above-mentioned first embodiment has been described in the case where when the update of the content list is completed, the items indicating the types of content that is capable of being provided to the local reproduction device 300 (the menu directories A, B, and the list update information C) are transmitted to the local reproduction device 300; however, the invention is not limited to this case, and the item used to request the items indicating the type of content that may be provided to the local reproduction device 300 (the root directory R) may be transmitted to the local reproduction device 300.

The above-mentioned first embodiment has been described in the case where during the update of the content list, the list update content is transmitted to the local reproduction device 300; however, the invention is not limited to this case, and the list update content may not be transmitted to the local reproduction device 300 during the update of the content list.

Further, a program that causes a computer to execute the operations (i.e., the sequences shown in FIGS. 7 and 8) of the content transmission system 1 may be provided, for example. A storage in which such program is stored may also be provided. A storage in which the program is stored is, for example, a CD-ROM attached to each of the local server 200 and the local reproduction device 300.

In this manner, the present invention naturally includes various embodiments not specifically described herein. Accordingly, the technical scope of the present invention should be defined only by the specifications of the invention according to the claims based on the above description.

What is claimed is:

1. A local server configured to transmit a content list to a local reproduction device connected to the local server via a local network, the content list being a list of content that is capable of being provided to the local reproduction device, the local server comprising:
    a transmitter configured to transmit the content list including list update information including an item in the content list for requesting update of the content list to the local reproduction device, the content list having a directory structure composed of items capable of being selected by the local reproduction device;
    a receiver configured to receive a list update request from the local reproduction device, the list update request indicating that the list update information has been selected; and
    an updater configured to update the content list according to the list update request.

2. The local server according to claim 1, wherein the transmitter transmits list update content to the local reproduction device according to the list update request until the update of the content list is completed, the list update content notifying the local reproduction device that the update of the content list is in progress.

3. The local server according to claim 1, further comprising:
    a storage configured to store the content list, wherein
    the updater updates the content list stored in the storage according to the list update request received by the receiver.

4. The local server according to claim 1, wherein the list update information is stored in an independent directory of the directory structure of the content list.

5. A control method for a local server configured to transmit a content list to a local reproduction device connected to the local server via a local network, the content list being a list of content that is capable of being provided to the local reproduction device, the control method comprising:
    transmitting the content list including list update information including an item in the content list for requesting update of the content list to the local reproduction device, the content list having a directory structure composed of items capable of being selected by the local reproduction device;
    receiving a list update request from the local reproduction device, the list update request indicating that the list update information has been selected; and
    updating the content list according to the list update request.

6. The control method according to claim 5, further comprising:
    transmitting list update content to the local reproduction device according to the list update request until the update of the content list is completed, the list update content notifying the local reproduction device that the update of the content list is in progress.

7. The control method according to claim 5, wherein the updating includes updating the content list stored in a storage provided in the local server according to the list update request received in the receiving.

8. The control method according to claim 5, wherein the list update information is stored in an independent directory of the directory structure of the content list.

* * * * *